(12) United States Patent
Higaki et al.

(10) Patent No.: US 10,332,268 B2
(45) Date of Patent: Jun. 25, 2019

(54) IMAGE PROCESSING APPARATUS, GENERATION METHOD, AND NON-TRANSITORY COMPUTER-READABLE STORAGE MEDIUM

(71) Applicant: CANON KABUSHIKI KAISHA, Tokyo (JP)

(72) Inventors: Yoshinari Higaki, Yokohama (JP); Tatsuro Koizumi, Niiza (JP); Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/674,999

(22) Filed: Aug. 11, 2017

(65) Prior Publication Data
US 2018/0061069 A1 Mar. 1, 2018

(30) Foreign Application Priority Data
Aug. 31, 2016 (JP) .................................. 2016-170067

(51) Int. Cl.
*G06T 7/50* (2017.01)
*G06T 5/50* (2006.01)

(52) U.S. Cl.
CPC .................. *G06T 7/50* (2017.01); *G06T 5/50* (2013.01); *G06T 2207/10024* (2013.01); *G06T 2207/10028* (2013.01)

(58) Field of Classification Search
CPC ... G06T 5/50; G06T 2207/10028; G06T 7/50; G06T 2207/10024
See application file for complete search history.

(56) References Cited

U.S. PATENT DOCUMENTS

| 7,327,363 | B2 | 2/2008 | Fujiwara et al. |
| 2009/0079728 | A1* | 3/2009 | Sugita .................... G06T 15/20 345/418 |
| 2012/0113094 | A1* | 5/2012 | Shimoyama .............. G06T 7/50 345/419 |
| 2012/0268567 | A1* | 10/2012 | Nakazato ............... G01B 11/03 348/46 |
| 2013/0182943 | A1* | 7/2013 | Tsai ..................... H04N 13/026 382/154 |

(Continued)

FOREIGN PATENT DOCUMENTS

JP 2006107093 A 4/2006

*Primary Examiner* — Yon J Couso
(74) *Attorney, Agent, or Firm* — Rossi, Kimms & McDowell LLP (57) ABSTRACT

Coordinates on a two-dimensional image that respectively correspond to points on a three-dimensional space that configures an object included in a field of view based on a viewpoint are specified. A depth map is generated based on a result of assignment processing that assigns distance information of a first point corresponding to first coordinates to a first area including the first coordinates and assigns distance information of a second point corresponding to second coordinates to a second area including the second coordinates, the first and second coordinates belonging to coordinates on the two-dimensional image. A distance from the viewpoint to the first point is longer than a distance from the viewpoint to the second point, and the first area is smaller than the second area. The points configuring the object include the first and second points.

14 Claims, 9 Drawing Sheets

(56) References Cited

U.S. PATENT DOCUMENTS

2015/0062370 A1\* 3/2015 Shroff .................. H04N 5/2226
 348/222.1
2015/0154776 A1\* 6/2015 Zhang .................... G06T 11/60
 382/284

\* cited by examiner

FIG. 4A $W = \max(W_{min}, \min(W_{max}, W_0 - \alpha D))$

FIG. 4B $W = \min(W_{max}, \alpha/D)$

IMAGE PROCESSING APPARATUS, GENERATION METHOD, AND NON-TRANSITORY COMPUTER-READABLE STORAGE MEDIUM

BACKGROUND OF THE INVENTION

Field of the Invention

The present invention relates to a technique of generating a depth map of a target object.

Description of the Related Art

Conventionally there is a technique for generating a range image (a depth map), which represents a distribution of distances between a particular viewpoint and an object that has a three-dimensional shape, by using a point cloud that configures the object. In Japanese Patent Laid-Open No. 2006-107093, cells (voxels or the like) that configure a three-dimensional object defined by volume data are projected onto a plurality of reference projection planes, and a depth map is generated at a particular viewpoint by using two or more reference projection planes.

In the case of generating a range image, in Japanese Patent Laid-Open No. 2006-107093, for each position on the target object, a corresponding pixel position on the range image is specified, and a distance value representing a distance to the position is assigned as a pixel value of the pixel position. By such a method, it is possible to assign distance values to pixel positions on the range image that respectively correspond to each position on the target object. However, "pixel positions on the range image that respectively correspond to each position on the target object" are not necessarily contiguous positions on the range image. In other words, in a method of generating a range image in the conventional technique, pixels on the range image to which a distance value cannot be assigned (defective pixels) occur.

SUMMARY OF THE INVENTION

According to the first aspect of the present invention, there is provided an image processing apparatus that generates a depth map that represents distances from a predetermined viewpoint in a field of view based on the predetermined viewpoint, the apparatus comprising: a specification unit configured to specify coordinates on a two-dimensional image that respectively correspond to a plurality of points on a three-dimensional space that configures an object included in the field of view; and a generation unit configured to generate the depth map based on a result of assignment processing that assigns distance information of a first point corresponding to first coordinates to a first area that includes the first coordinates and assigns distance information of a second point corresponding to second coordinates to a second area that includes the second coordinates, the first and second coordinates belonging to a plurality of coordinates on the two-dimensional image that are specified by the specification unit, wherein a distance from the predetermined viewpoint to the first point corresponding to the first coordinates is longer than a distance from the predetermined viewpoint to the second point corresponding to the second coordinates, and the first area is smaller than the second area, and wherein the plurality of points that configure the object include the first point and the second point.

According to the second aspect of the present invention, there is provided a generation method for generating a depth map that represents distances from a predetermined viewpoint in a field of view based on the predetermined viewpoint, the method comprising: specifying coordinates on a two-dimensional image that respectively correspond to a plurality of points on a three-dimensional space that configures an object included in the field of view; and generating the depth map based on a result of assignment processing that assigns distance information of a first point corresponding to first coordinates to a first area that includes the first coordinates and assigns distance information of a second point corresponding to second coordinates to a second area that includes the second coordinates, the first and second coordinates belonging to the plurality of coordinates specified on the two-dimensional image, wherein a distance from the predetermined viewpoint to the first point corresponding to the first coordinates is longer than a distance from the predetermined viewpoint to the second point corresponding to the second coordinates, and the first area is smaller than the second area, and wherein the plurality of points that configure the object include the first point and the second point.

According to the third aspect of the present invention, there is provided a non-transitory computer-readable storage medium storing a program for causing a computer to execute a generation method of generating a depth map that represents distances from a predetermined viewpoint in a field of view based on the predetermined viewpoint, the method comprising: specifying coordinates on a two-dimensional image that respectively correspond to a plurality of points on a three-dimensional space that configures an object included in the field of view; and generating the depth map based on a result of assignment processing that assigns distance information of a first point corresponding to first coordinates to a first area that includes the first coordinates and assigns distance information of a second point corresponding to second coordinates to a second area that includes the second coordinates, the first and second coordinates belonging to the plurality of coordinates specified on the two-dimensional image, wherein a distance from the predetermined viewpoint to the first point corresponding to the first coordinates is longer than a distance from the predetermined viewpoint to the second point corresponding to the second coordinates, and the first area is smaller than the second area, and wherein the plurality of points that configure the object include the first point and the second point.

Further features of the present invention will become apparent from the following description of exemplary embodiments (with reference to the attached drawings).

DESCRIPTION OF THE EMBODIMENTS

Below, explanation will be given for embodiments of present invention with reference to the accompanying drawings. Note that embodiments described below merely illustrate examples of specifically implementing the present invention, and are only specific embodiments of a configuration defined in the scope of the claims.

[First Embodiment]

An image processing apparatus of the present embodiment projects each of a plurality of three-dimensional coordinates representing the shape of a target object (an object) onto a two-dimensional image, and generates a range image (a depth map) by assigning distance values (distance information) to the projected coordinates. Please note that, in the present embodiment, for convenience there are cases where a two-dimensional image before distance information is assigned and a two-dimensional image after distance information is assigned are both referred to as a depth map.

Figure 1:
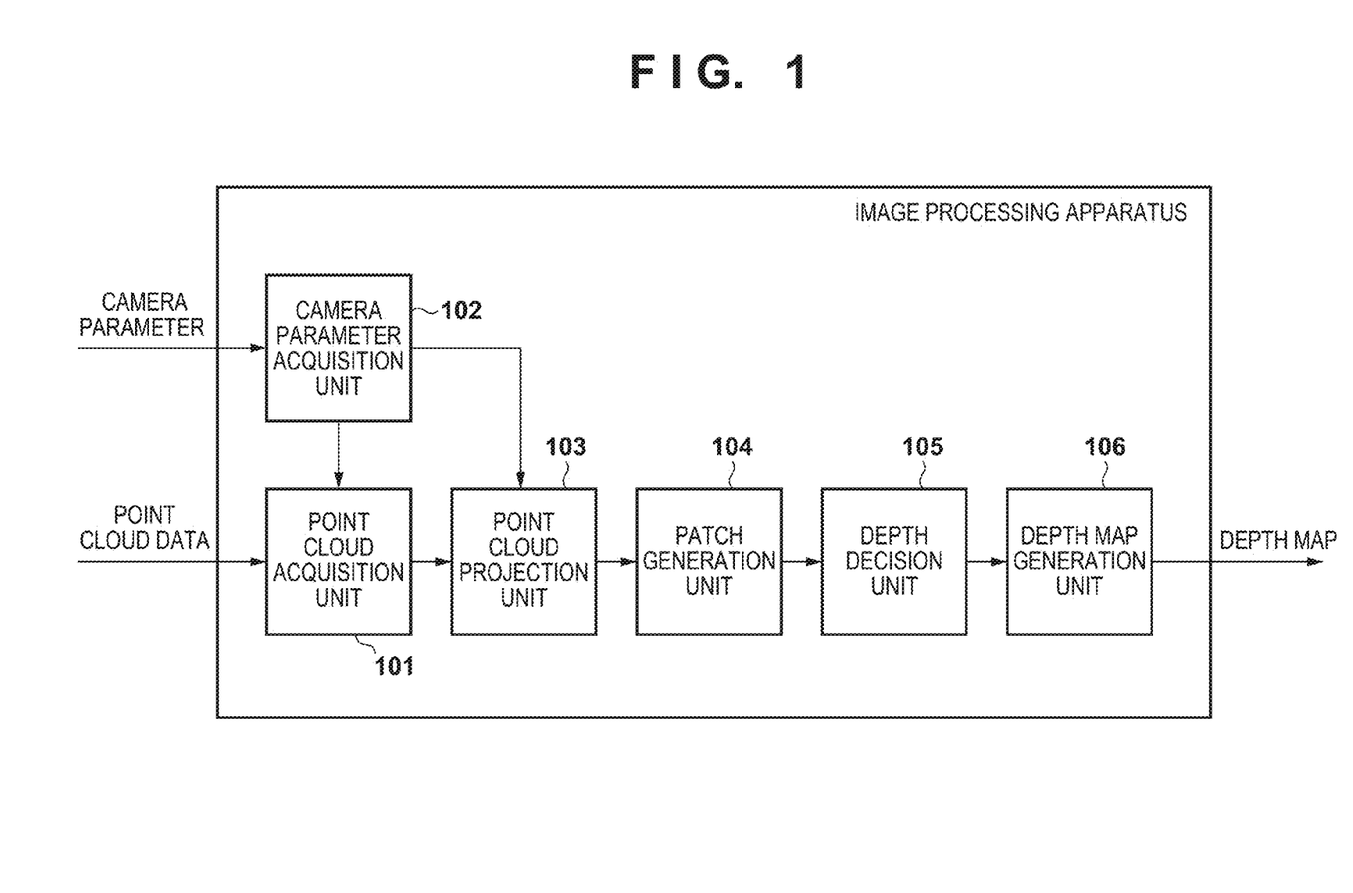
FIG. 1 is a block diagram describing an example of a functional configuration of an image processing apparatus.

The block diagram of FIG. 1 is used to give an explanation regarding an example of a functional configuration of an image processing apparatus according to the present embodiment.

A point cloud acquisition unit 101 acquires data (point cloud data) that represents three-dimensional coordinates of a plurality of points on a target object that has a three-dimensional shape. The point cloud data is for example generated by extracting outlines of the target object from each of a plurality of captured images of the target object that are captured by a plurality of cameras arranged around the target object and facing the target object, and using the outlines extracted from each of the captured images. Because a technique for acquiring point cloud data of a target object from the outline of the target object in a plurality of captured images is well-known, explanation regarding this technique is omitted. Note that a method for acquiring point cloud data of a target object is not limited to the above method. For example, in a case where an apparatus that emits infrared light is used, it is possible to acquire three-dimensional coordinates of a plurality of points on a target object without using a plurality of cameras. Note that point cloud data in the present embodiment is data that represents respective positions of a plurality of points that are positioned on the surface of a target object, and, for example, is data that describes three-dimensional coordinates of each point in a reference coordinate system that is set in a space in which the target object is arranged. Of course, any information may be represented by point cloud data if it can define positions of a plurality of points on a target object.

A camera parameter acquisition unit 102 acquires, as camera parameters, parameters such as a focal length, an orientation, and a position of a predetermined viewpoint (hereinafter referred to as an observation viewpoint) for observing a target object.

Figure 2:
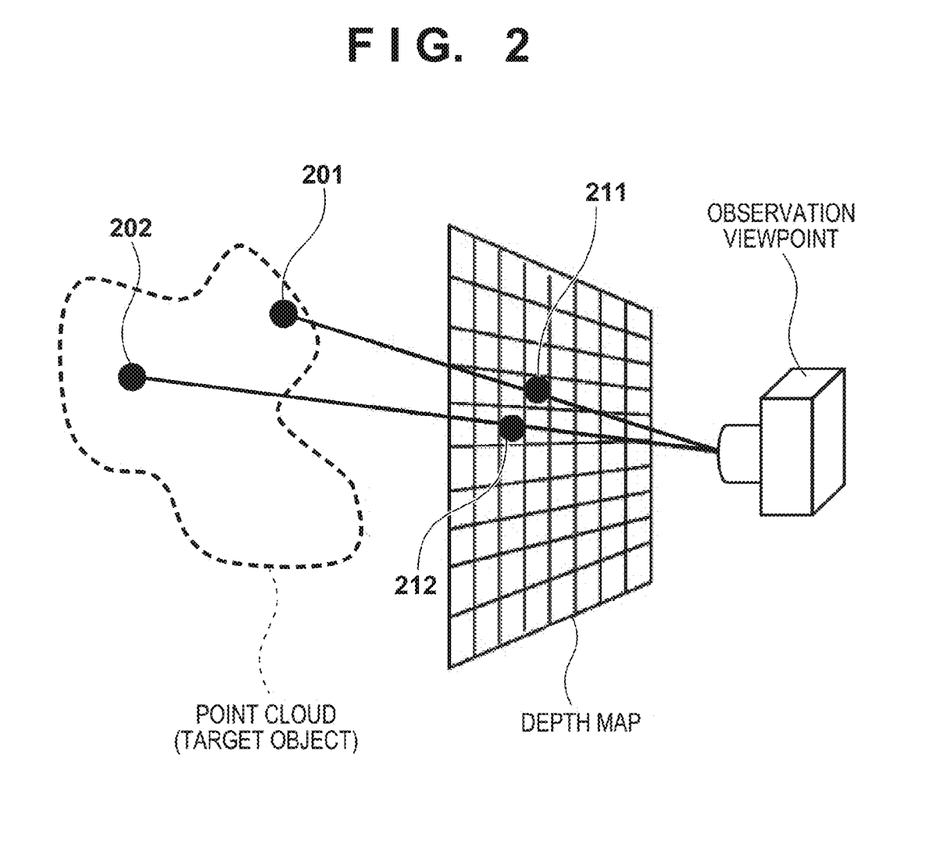
FIG. 2 is a view for explaining a point cloud projection unit 103.

A point cloud projection unit 103 specifies projected positions for projecting three-dimensional positions of each point represented by the point cloud data, onto a range image (a depth map) that describes a distance distribution between the observation viewpoint and the target object. For example, as illustrated in FIG. 2, an intersection position 211 between the depth map and a line segment that passes between a three-dimensional position of an observation viewpoint (defined by the camera parameters) and a three-dimensional position of a point 201 (the point 201 on the target object) out of the three-dimensional positions of the points represented by the point cloud data is a projected position for projecting the three-dimensional position of the point 201 onto the depth map. The depth map is a projection plane that is orthogonal to a visual axis of the observation viewpoint, and the visual axis passes through a center position of the depth map. In addition, an intersection position 212 between the depth map and a line segment that passes between a three-dimensional position of an observation viewpoint (defined by the camera parameters) and a three-dimensional position of a point 202 (the point 202 on the target object) out of the three-dimensional positions of the points represented by the point cloud data is a projected position for projecting the three-dimensional position of the point 202 onto the depth map. In this way, projected positions for projecting three-dimensional positions of each point on the target object onto a depth map are specified. Note that, because a depth map is a range image in which the pixel value at each pixel position represents a distance value, a pixel position closest to an intersection position is set as a projected position. In addition, it is assumed that a value corresponding to a background is set in advance to the pixel value at each pixel position of the depth map. As a value corresponding to a background, the same value $\theta$ that is sufficiently large may be set to all pixels, or configuration may be taken to assume a simple structure (for example, a combination of a plurality of planes) for the background, and set a calculated distance value for each pixel position. Below, explanation is given assuming that $\theta$ is uniformly set as a value corresponding to a background.

Figure 3A:
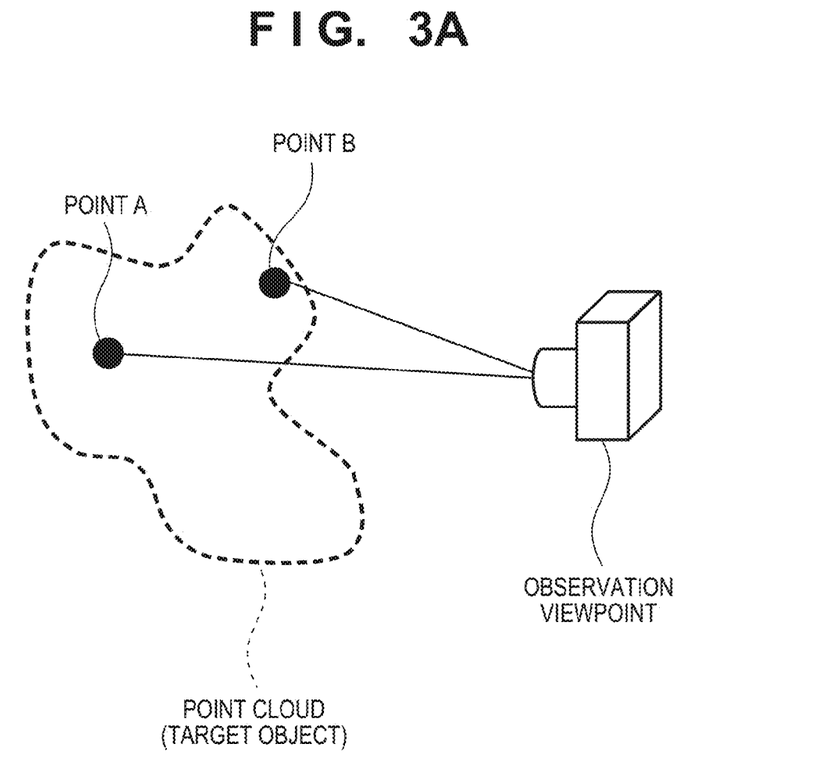
FIGS. 3A and 3B are views for explaining a patch generation unit 104.
Figure 3B:
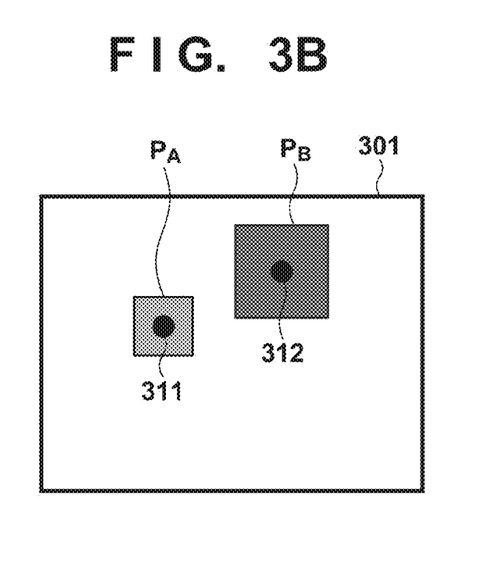

A patch generation unit 104 sets on the depth map a rectangular area (a patch) of a size W (for example the length of a side) centered on a projected position of a point. The size W of the patch centered on the projected position of the point changes in accordance with the distance between the point and the observation viewpoint. In other words, the size W of the patch centered on the projected position of the point gets smaller as the distance D between the point and the observation viewpoint increases, and gets larger as the distance D decreases. For example, as illustrated in FIGS. 3A and 3B, in a case where a projected position 311 on a depth map 301 for a point A is specified, a patch $P_A$ that is of a size WA in accordance with a distance DA between the observation viewpoint and the point A and is centered on the projected position 311 is set on the depth map 301. In addition, in a case where a projected position 312 on the depth map 301 for a point B is specified, a patch $P_B$ that is of a size WB in accordance with a distance DB between the observation viewpoint and the point B and is centered on the projected position 312 is set on the depth map 301. In the case of FIG. 3A, because DA>DB, as illustrated in FIG. 3B, the size of the patch $P_A$ is smaller than the size of the patch $P_B$. The relation between the distance D between a point and the observation viewpoint, and the size of a patch centered on the projected position of the point on the depth map is illustrated in FIGS. 4A and 4B.

Figure 4A:
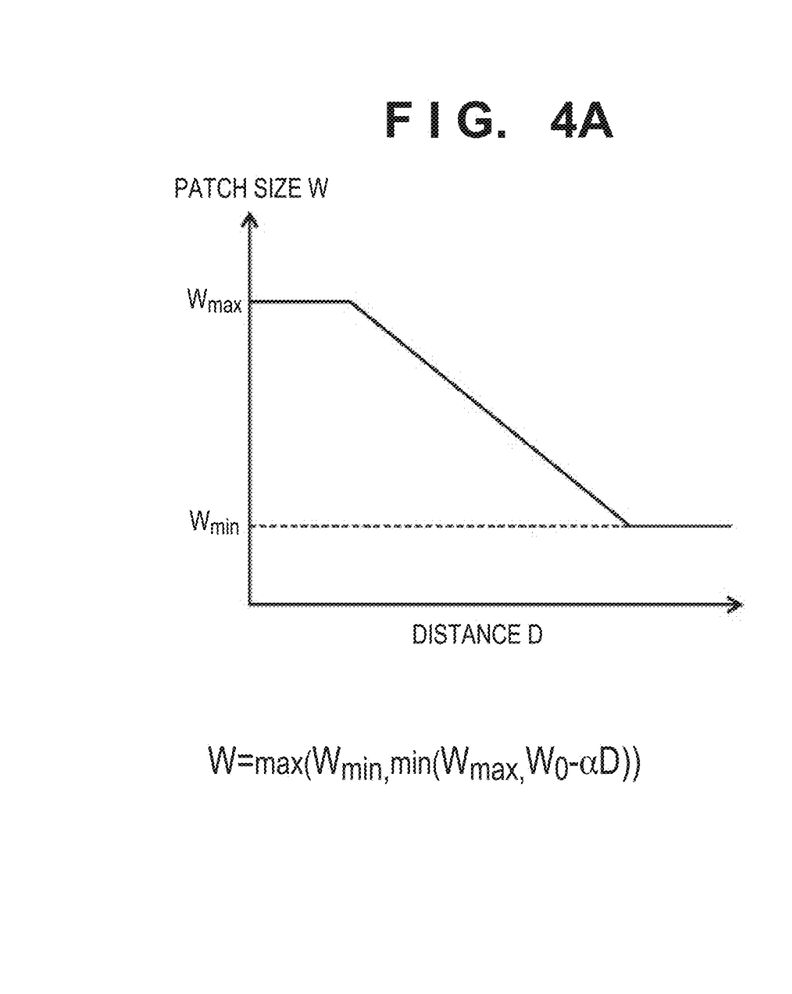
FIGS. 4A and 4B are views illustrating relationships between a size W of a patch and a distance D.

In the case of FIG. 4A, when $0 \leq D < Dp = (W_0 - W_{max})/\alpha$ (where $W_0$ and $\alpha$ are defined parameters, $W_0 > W_{max}$, and $\alpha > 0$) holds for the distance D, the size W (the patch size W)=$W_{max}$. When $Dp < D \leq Dq = (W_0 - W_{min})/\alpha$ holds for the distance D, the size W monotonically decreases linearly with respect to the distance D. When D>Dq holds for the distance D, the size W=$W_{min}$. In the case of FIG. 4B, when $0 \leq D < Dr = \alpha/W_{max}$ holds for the distance D, the size W=$W_{max}$, and when the distance D≥Dr, the size W monotonically decreases inversely proportional to the distance D.

Note that $W_{max}$ indicates an upper limit size for the size W, and $W_{min}$ indicates a lower limit size for the size W.

Figure 4B:
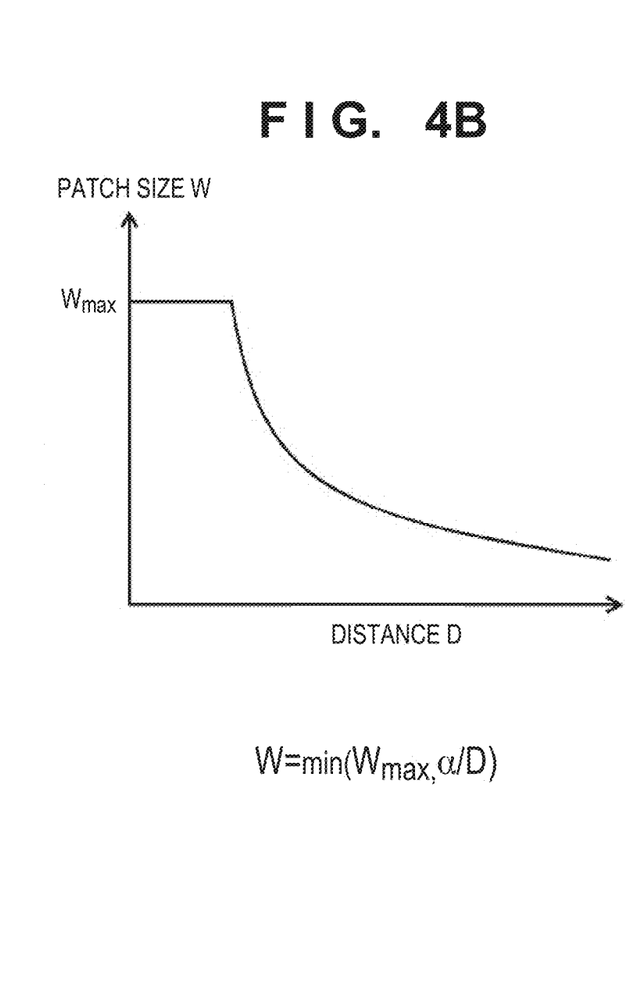

The relation between the distance D and the size W is not limited to the relations illustrated in FIGS. 4A and 4B if in this way the size W is decided such that there is a tendency for the size W to decrease as the distance D increases and for the size W to increase as the distance D decreases. When acquiring a patch size in accordance with an obtained distance, the patch generation unit 104 may acquire a size W that forms a pairs with a distance D closest to the obtained distance, from a table that registers a plurality of pairs of a distance D value and a corresponding size W value. In addition, in a case of acquiring a patch size in accordance with the obtained distance, the patch generation unit 104 may acquire a size W corresponding to the obtained distance from a function that represents a relation between the distance D and the size W. In this way, the patch generation unit 104 sets, on the depth map, patches corresponding to each point on the target object.

For each patch set on the depth map, a depth decision unit 105 sets a distance D that corresponds to the patch to the pixel value of each pixel in the patch. For example, in the case of FIG. 3B, the distance DA is set to the pixel value of each pixel in the patch $P_A$, and the distance DB is set to the pixel value of each pixel in the patch $P_B$.

Figure 5A:
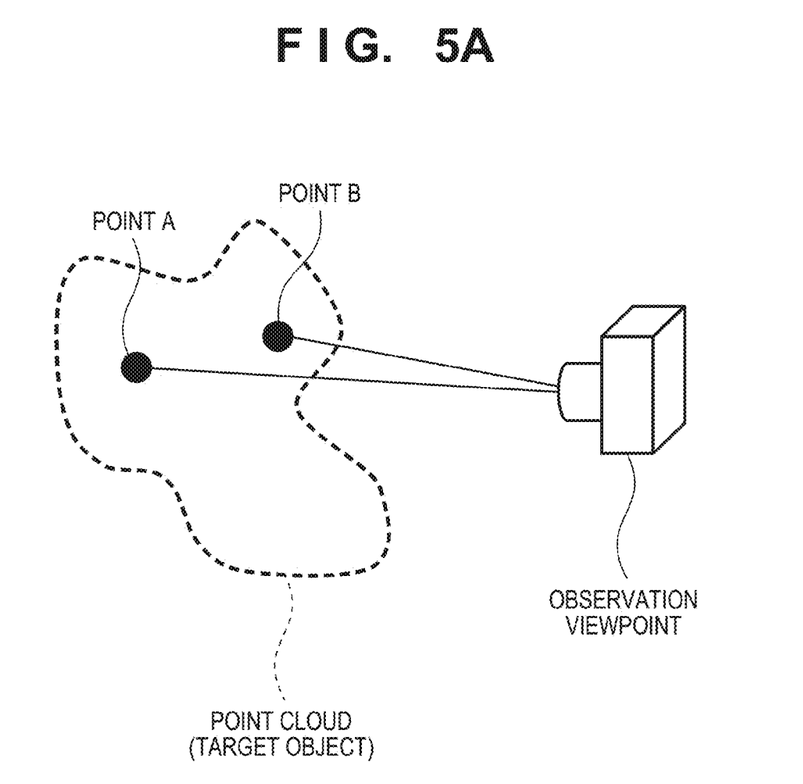
FIGS. 5A to 5C are views illustrating an area in which there is overlap among patches.
Figure 5B:
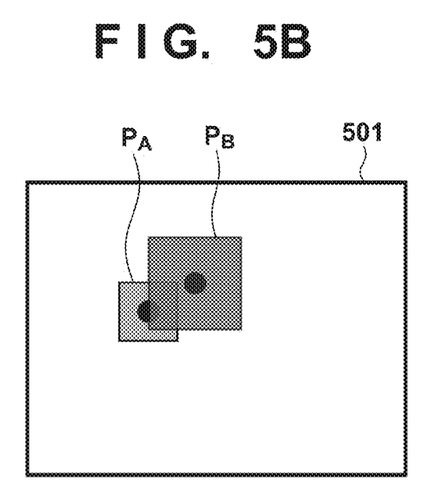
Figure 5C:
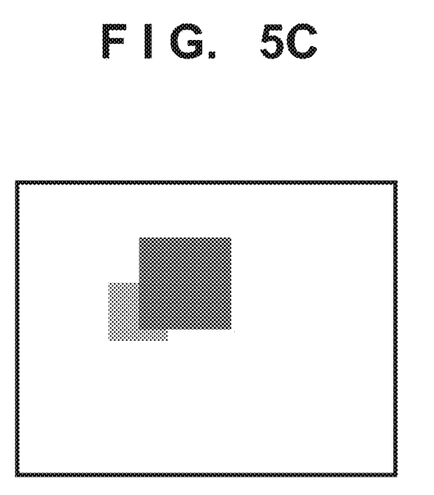

Note that, as illustrated in FIG. 5B, if an area in which the patch $P_A$ and the patch $P_B$ are overlapping each other occurs, the depth decision unit 105 sets the smaller of the distance DA and the distance DB (the distance DB in the case of FIG. 5A) to the pixel value of each pixel in the area. A result thereof is illustrated in FIG. 5C. In other words, when a first patch and a second patch set on the depth map have an area in which they overlap with each other, the depth decision unit 105 assigns to the overlapping area the smaller distance value (distance information) out of the distance value (distance information) corresponding to the first patch and the distance value corresponding to the second patch.

Figure 6:
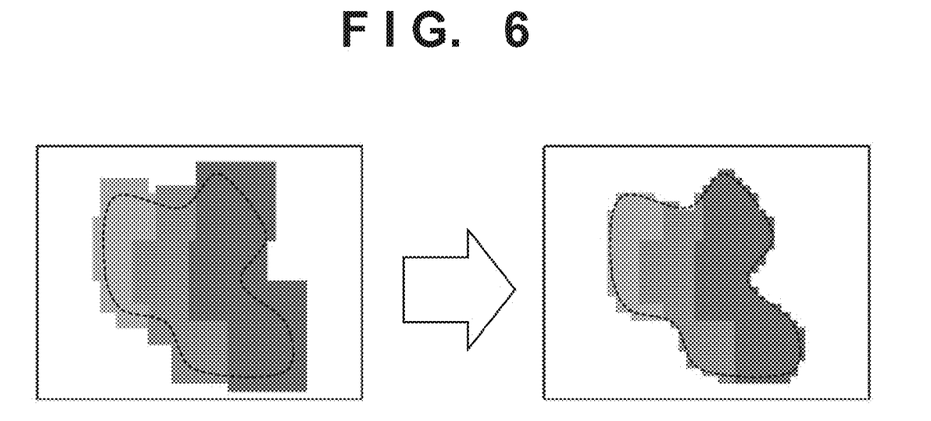
FIG. 6 is a view for explaining a depth map generation unit 106.

The depth map generation unit 106 applies filter processing that uses a maximum value filter to each pixel position on the depth map where patches corresponding to each point on the target object have been set and distance values have been set to each patch. As illustrated by the left side of FIG. 6, an area where a group of patches have been formed on a depth map (a patch group area) often protrudes from an area of a target object (an outline thereof is indicated by a dotted line) that should be visible from the observation viewpoint. Therefore, the depth map generation unit 106 applies the aforementioned maximum value filter to the depth map to suppress an amount of protrusion. For example, when a maximum value filter having a size of 3×3 is applied to a pixel of interest on a depth map, the pixel value of the pixel of interest is updated to a pixel value that is a maximum out of the pixel values of a total of 9 pixels: the pixel of interest and 8 surrounding pixels. In a case of applying the maximum value filter to a pixel of interest at an outermost portion of the patch group area (that is within the patch group area), pixels on the patch and pixels outside of the patch will be mixed inside the range of the maximum value filter. In such a case, because a pixel value θ that is sufficiently large to represent the background is set to pixel values of pixels outside of the patch as described above, when the maximum value filter is applied to the pixel of interest, the pixel value of the pixel of interest is replaced by θ. In other words, the pixel value of pixels near to an outermost portion of the patch group area are all replaced by θ, and it is possible to suppress the amount of protrusion described above (right side of FIG. 6). Note that the size of the maximum value filter may be fixed, or it may appropriately change in accordance with a size of the patch to which a pixel of interest belongs. For example, configuration may be taken such that the size of the maximum value filter increases as the size of the patch to which the pixel of interest belongs increases, and the size of the maximum value filter decreases as the size of the patch to which the pixel of interest belongs decreases.

When the filter processing that applies the maximum value filter for each pixel position on the depth map completes, the depth map generation unit 106 outputs a depth map for which the filter processing has completed. An output destination of the depth map for which the filter processing has completed is not limited to a specific output destination. In addition, the image processing apparatus may generate an image of the target object from a perspective of the observation viewpoint by using the depth map for which the filter processing has completed and an image of the target object from a perspective of a viewpoint that is not the observation viewpoint.

Figure 7:
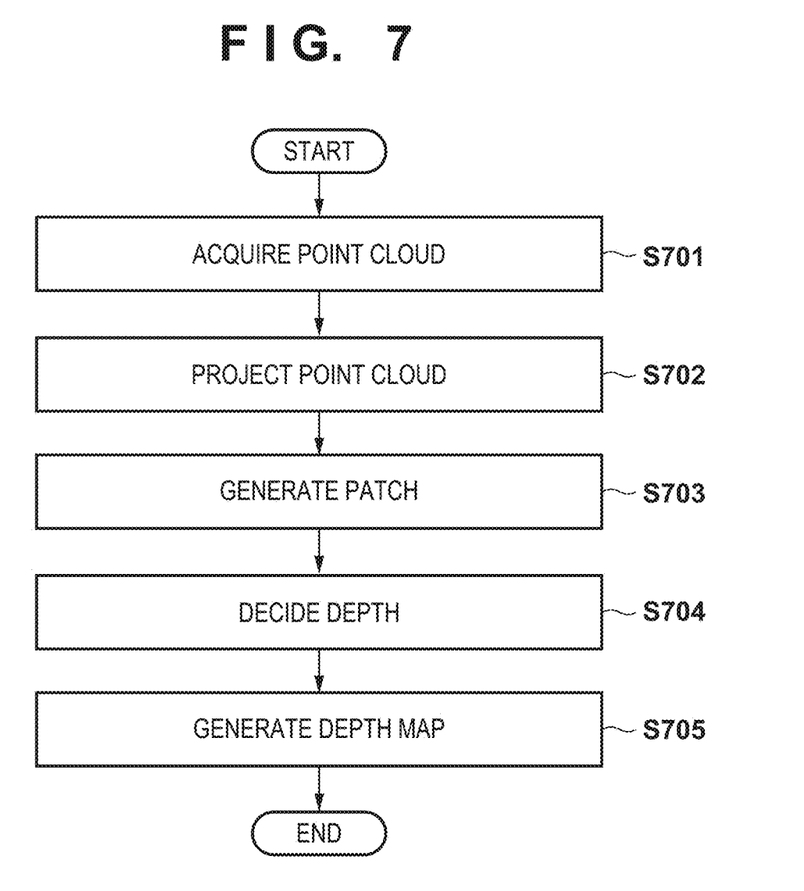
FIG. 7 is a flowchart for describing an operation of the image processing apparatus.

Explanation in accordance with the flowchart of FIG. 7 is given regarding operation of the image processing apparatus that was described above. In step S701, the point cloud acquisition unit 101 acquires data of a point cloud on the target object that has a three-dimensional shape (point cloud data), and the camera parameter acquisition unit 102 acquires camera parameters for the observation viewpoint.

In step S702, the point cloud projection unit 103 specifies projected positions at which three-dimensional positions of each point represented by the point cloud data has been projected onto the depth map. In step S703, for each projected position of a point, the patch generation unit 104 sets on the depth map a patch centered on the projected position.

In step S704, for each patch set on the depth map, the depth decision unit 105 sets a distance value that corresponds to the patch to the pixel value of each pixel in the patch. In step S705, the depth map generation unit 106 applies filter processing that uses a maximum value filter to each pixel position on the depth map where patches corresponding to each point on the target object have been arranged and distance values have been set to each patch. When the filter processing that applies the maximum value filter for each pixel position on the depth map completes, the depth map generation unit 106 outputs a depth map that has been subject to filter processing.

[Second Embodiment]

In a depth map generated by the depth map generation unit 106 that has been subject to filter processing, configuration may be taken to perform filter processing for smoothing the outline of an area of a pixel group other than pixels that have a pixel value representing the background, in other words the outline of an area of the target object in the depth map that has been subject to filter processing. An "outline of an area of the target object in the depth map generated by the depth map generation unit 106 that has been subject to filter processing" may be acquired by using another method. For example, configuration may be taken to set an area containing a minimum of projected positions on a depth map of a point cloud as the area of the target object on the depth map, and use the outline of the area as the "outline of an area of the target object in the depth map generated by the depth map generation unit 106 that has been subject to filter processing".

Figure 9:
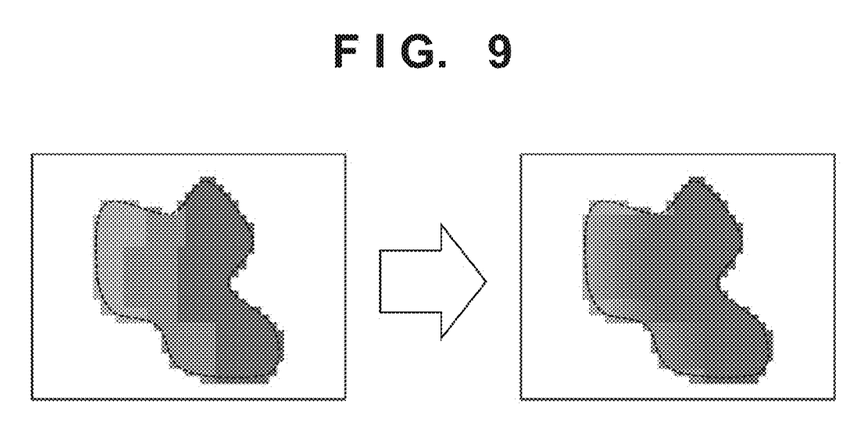
FIG. 9 is a view for explaining a second embodiment.

In addition, configuration may also be taken to perform pixel value smoothing filter processing for performing smoothing of pixel values inside the area of the target object in the depth map generated by the depth map generation unit 106 that has been subject to filter processing. The left side of FIG. 9 illustrates a "depth map generated by the depth map generation unit 106 that has been subject to filter processing" and the right side illustrates a "result of pixel value smoothing filter processing with respect to a depth map generated by the depth map generation unit 106 that has been subject to filter processing". In addition, a method for suppressing the aforementioned amount of protrusion is not limited to filter processing that uses a maximum value filter. In addition, the shape of a patch is not limited to a rectangle.

[Third Embodiment]

Figure 8:
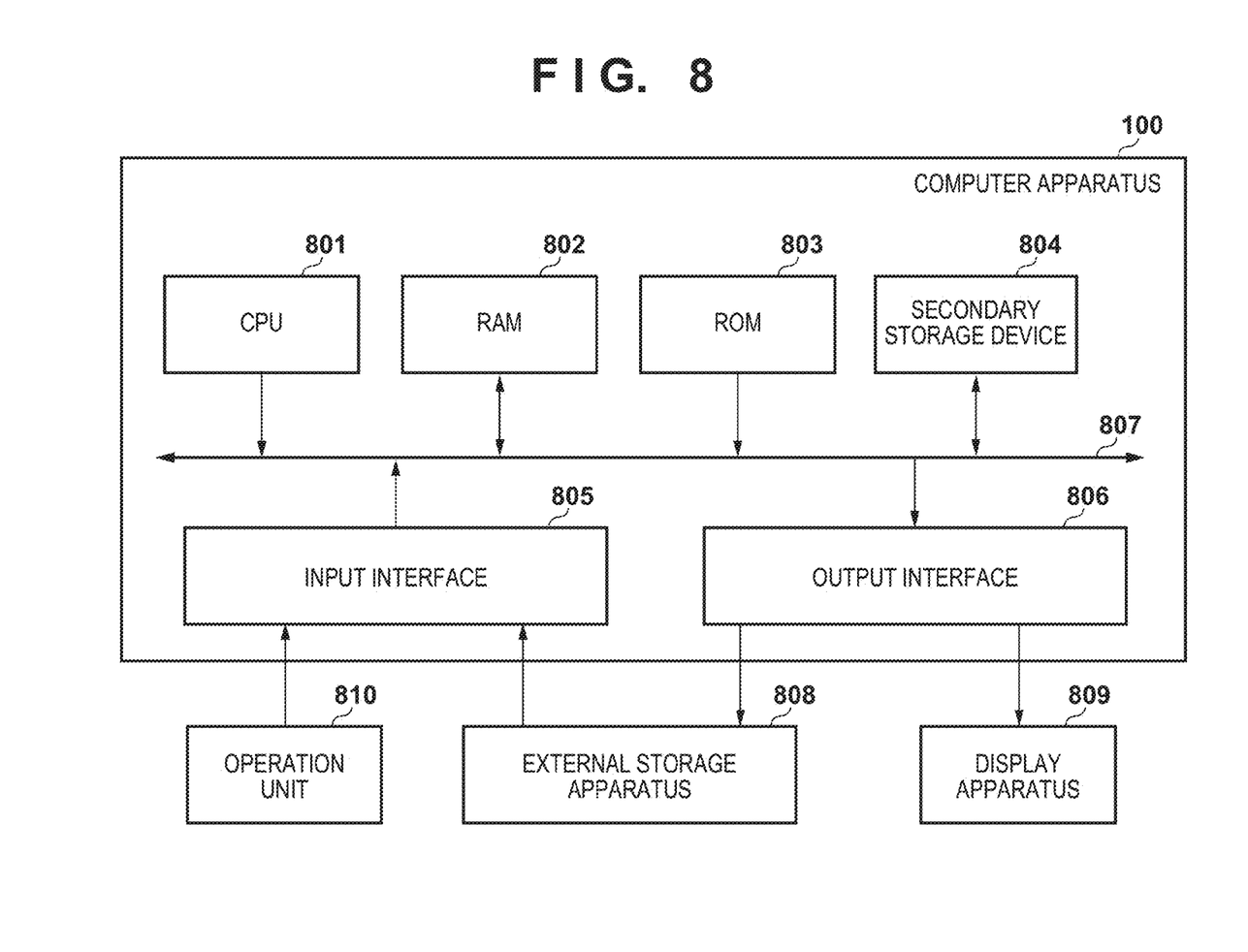
FIG. 8 is a view illustrating an example of a hardware configuration of a computer apparatus.

All of the functional units of the image processing apparatus illustrated in FIG. 1 may be implemented by hardware, but may be implemented by software (a computer program). In the latter case, it is possible to apply a computer apparatus that has a memory for storing the computer program and a processor for executing the computer program, to the aforementioned image processing apparatus. The block diagram of FIG. 8 is used to give an explanation regarding an example of a hardware configuration of a computer apparatus that can be applied to the aforementioned image processing apparatus.

A CPU 801 executes various processing by using data and a computer program stored in a RAM 802 or a ROM 803. By this, the CPU 801 performs operation control of the computer apparatus 100 overall, and also executes or controls each process described above as something that the image processing apparatus performs.

The RAM 802 has an area for storing a computer program or data loaded from a secondary storage device 804, an external storage apparatus 808, or the ROM 803. The RAM 802 also has a work area that is used when the CPU 801 executes various processing. In this way, the RAM 802 can appropriately provide various areas. The ROM 803 stores, for example, a computer program or setting data that does not need to be rewritten.

The secondary storage device 804 is a large capacity information storage device typified by a hard disk drive device. The secondary storage device 804 stores an OS (operating system), as well as data or a computer program for causing the CPU 801 to execute the processing described above as something that the image processing apparatus performs. The computer program includes a computer program for causing the CPU 801 to execute functions of each functional unit illustrated in FIG. 1. In addition, the data includes that which has been described as known information in the explanation above, for example, data (table data or function data) that represents a relation between the size W and the distance D illustrated in FIGS. 4A and 4B. Data or a computer program stored in the secondary storage device 804 is loaded into the RAM 802 as appropriate in accordance with control by the CPU 801, and becomes a target of processing by the CPU 801.

A operation unit 810 is configured by a user interface such as a mouse or a keyboard, and by operation thereof a user can input various instructions to the CPU 801 via an input interface 805.

The external storage apparatus 808 performs reading or writing of data or a computer program with respect to a storage medium such as a CD-RW or a DVD-RW. Data or a computer program read from the storage medium by the secondary storage device 804 is outputted to the RAM 802 or the secondary storage device 804 via the input interface 805. Meanwhile, data or a computer program that the external storage apparatus 808 writes to a storage medium is outputted to the external storage apparatus 808 via an output interface 806 from the RAM 802 or the secondary storage device 804. In addition, configuration may also be taken to store some or all of data or a computer program, explained above as something stored in the secondary storage device 804, in a storage medium in advance, and read from the storage medium into the RAM 802 or the secondary storage device 804 by the external storage apparatus 808.

A display apparatus 809 is configured by a CRT, a liquid crystal screen, or the like, and displays a result of processing by the CPU 801 by using an image, text, or the like. Note that configuration may be taken to integrate the operation unit 810 and the display apparatus 809 as a touch panel screen. The CPU 801, the RAM 802, the ROM 803, the secondary storage device 804, the input interface 805, and the output interface 806 are all connected to a bus 807.

By the configuration of the present embodiment, it is possible to reduce the possibility of pixels on the range image to which a distance value cannot be assigned (defective pixels) from occurring.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-170067, filed Aug. 31, 2016, which is hereby incorporated by reference herein in its entirety.

What is claimed is:

1. An image processing apparatus that generates a depth map that represents distances from a predetermined viewpoint in a field of view based on the predetermined viewpoint, the apparatus comprising:
    a processor configured to implement instructions stored in a memory and execute a plurality of tasks, including:
        a specification task that specifies coordinates on a two-dimensional image that respectively correspond to a plurality of points on a three-dimensional object included in the field of view; and a generation task that generates the depth map based on a result of assignment processing that assigns distance information of a first point corresponding to first coordinates to a first area that includes the first coordinates and assigns distance information of a second point corresponding to second coordinates to a second area that includes the second coordinates, the first and second coordinates belonging to a plurality of coordinates on the two-dimensional image that are specified by the specification unit, wherein a distance from the predetermined viewpoint to the first point corresponding to the first coordinates is longer than a distance from the predetermined viewpoint to the second point corresponding to the second coordinates, and the first area that includes the first coordinates corresponding to the first point is smaller than the second area that includes the second coordinates corresponding to the second point, and wherein the plurality of points include the first point and the second point.

2. The image processing apparatus according to claim 1, wherein the two-dimensional image is in a projection plane orthogonal to a visual axis of the predetermined viewpoint, and the visual axis passes through a center position of the two-dimensional image.

3. The image processing apparatus according to claim 1, wherein, in a case where an overlapping area, where the first area and the second area are overlapping each other, exists, the generation task assigns to the overlapping area distance information corresponding to a shorter distance out of distance information corresponding to the first area and distance information corresponding to the second area.

4. The image processing apparatus according to claim 1, wherein the generation task generates the depth map by performing filter processing that uses a maximum value filter with respect to a plurality of pixel positions on the two-dimensional image in which distance information is assigned to the plurality of coordinates specified by the specification task.

5. The image processing apparatus according to claim 1, wherein the generation task generates the depth map by performing filter processing that smooths outlines of a plurality of areas that includes the first and the second areas.

6. The image processing apparatus according to claim 1, wherein the generation task generates the depth map by performing filter processing that smooths pixel values in a plurality of areas that include the first and the second areas.

7. The image processing apparatus according to claim 1, wherein each of the plurality of points is generated using information relating to an outline of the object in captured images, where the object is captured using a plurality of cameras.

8. A generation method of generating a depth map that represents distances from a predetermined viewpoint in a field of view based on the predetermined viewpoint, the method comprising the steps of:

specifying coordinates on a two-dimensional image that respectively correspond to a plurality of points on a three-dimensional object included in the field of view; and generating the depth map based on a result of assignment processing that assigns distance information of a first point corresponding to first coordinates to a first area that includes the first coordinates and assigns distance information of a second point corresponding to second coordinates to a second area that includes the second coordinates, the first and second coordinates belonging to the plurality of coordinates specified on the two-dimensional image, wherein a distance from the predetermined viewpoint to the first point corresponding to the first coordinates is longer than a distance from the predetermined viewpoint to the second point corresponding to the second coordinates, and the first area that includes the first coordinates corresponding to the first point is smaller than the second area that includes the second coordinates corresponding to the second point, and wherein the plurality of points include the first point and the second point.

9. A non-transitory computer-readable storage medium storing a program implemented by a computer to execute a generation method of generating a depth map that represents distances from a predetermined viewpoint in a field of view based on the predetermined viewpoint, the method comprising the steps of:

specifying coordinates on a two-dimensional image that respectively correspond to a plurality of points on a three-dimensional object included in the field of view; and generating the depth map based on a result of assignment processing that assigns distance information of a first point corresponding to first coordinates to a first area that includes the first coordinates and assigns distance information of a second point corresponding to second coordinates to a second area that includes the second coordinates, the first and second coordinates belonging to the plurality of coordinates specified on the two-dimensional image, wherein a distance from the predetermined viewpoint to the first point corresponding to the first coordinates is longer than a distance from the predetermined viewpoint to the second point corresponding to the second coordinates, and the first area that includes the first coordinates corresponding to the first point is smaller than the second area that includes the second coordinates corresponding to the second point, and wherein the plurality of points include the first point and the second point.

10. The image processing apparatus according to claim 1, wherein the plurality of tasks include an assignment task that assigns distance information of the first point corresponding to the first coordinates to the first area and assigns the distance information of the second point corresponding to the second coordinates to the second area.

11. The image processing apparatus according to claim 1, wherein the plurality of tasks include an area setting task that sets the first area and the second area on the two-dimensional image.

12. The image processing apparatus according to claim 1, wherein the plurality of tasks include an area setting task that sets areas so that a size of an area that includes coordinates on the two-dimensional image corresponding to a point gets smaller as a distance between the point and the predetermined viewpoint increases.

13. The image processing apparatus according to claim 12, wherein the plurality of tasks include an area setting task that sets an area having a predetermined size as an area that includes coordinates on the two-dimensional image corresponding to a point where a distance from the predetermined viewpoint is less than a predetermined value.

14. The image processing apparatus according to claim 12, wherein the area setting task sets an area having a predetermined size as an area that includes coordinates on the two-dimensional image corresponding to a point where a distance from the predetermined viewpoint is more than a predetermined value.

\* \* \* \* \*